US012752253B2

(12) United States Patent
Gao et al.

(10) Patent No.: US 12,752,253 B2
(45) Date of Patent: Oct. 6, 2026

(54) M-XYLENE ADSORBENT AND PREPARATION METHOD THEREFOR

(71) Applicants: CHINA PETROLEUM & CHEMICAL CORPORATION, Beijing (CN); SINOPEC RESEARCH INSTITUTE OF PETROLEUM PROCESSING CO., LTD., Beijing (CN)

(72) Inventors: Ningning Gao, Beijing (CN); Huiguo Wang, Beijing (CN); Yusi Liu, Beijing (CN); Hongchao Wang, Beijing (CN); Yanqiang Yang, Beijing (CN); Xiaofei Qiao, Beijing (CN); Dehua Wang, Beijing (CN); Jianfeng Ma, Beijing (CN); Jin Zhong, Beijing (CN); Junkui Gao, Beijing (CN); Pengfei Tuo, Beijing (CN)

(73) Assignees: CHINA PETROLEUM & CHEMICAL CORPORATION, Beijing (CN); SINOPEC RESEARCH INSTITUTE OF PETROLEUM PROCESSING CO., LTD., Beijing (CN)

( * ) Notice: Subject to any disclaimer, the term of this patent is extended or adjusted under 35 U.S.C. 154(b) by 650 days.

(21) Appl. No.: 18/248,658

(22) PCT Filed: Oct. 13, 2021

(86) PCT No.: PCT/CN2021/123445

§ 371 (c)(1),
(2) Date: Apr. 11, 2023

(87) PCT Pub. No.: WO2022/078362

PCT Pub. Date: Apr. 21, 2022

(65) Prior Publication Data

US 2023/0405547 A1 Dec. 21, 2023

(30) Foreign Application Priority Data

Oct. 15, 2020 (CN) .......................... 202011101177.2

(51) Int. Cl.
*B01J 20/16* (2006.01)
*B01J 20/22* (2006.01)
(Continued)

(52) U.S. Cl.
CPC ............ *B01J 20/165* (2013.01); *B01J 20/22* (2013.01); *B01J 20/28007* (2013.01);
(Continued)

(58) Field of Classification Search
CPC .... B01J 20/165; B01J 20/22; B01J 20/28007; B01J 20/28014; B01J 20/28064;
(Continued)

(56) References Cited

U.S. PATENT DOCUMENTS 4,306,107 A 12/1981 Broughton
4,326,092 A 4/1982 Neuzil
(Continued)

FOREIGN PATENT DOCUMENTS

CN 1136549 A 11/1996
CN 1354134 A * 6/2002
(Continued)

OTHER PUBLICATIONS

Kuhl ( "Source materials for zeolite synthesis," Elsevier Science B.V, p. 19-20 (Year: 2001).*
(Continued)

*Primary Examiner* — Daniel C. McCracken
*Assistant Examiner* — Starfari Teshawn McClain
(74) *Attorney, Agent, or Firm* — NKL Law; Allen Xue

(57) ABSTRACT

A m-xylene adsorbent contains 94 to 99.9 wt % of a Y molecular sieve and 0.1 to 6 wt % of a matrix. The Y
(Continued)

molecular sieve consists of a non-crystal-transformed Y molecular sieve and a Y molecular sieve produced by a crystal transformation. The non-crystal-transformed Y molecular sieve is a mesoporous nano Y molecular sieve, which has a crystalline grain size of 20 to 450 nanometers, contains two types of mesoporous pores, and respectively has most probable pore diameters of 5 to 20 nanometers and 25 to 50 nanometers. The adsorbent is used for adsorptive separation of m-xylene from mixed C8 aromatic hydrocarbons.

20 Claims, 7 Drawing Sheets

(51) Int. Cl.
*B01J 20/28* (2006.01)
*B01J 20/30* (2006.01)

(52) U.S. Cl.
CPC ... *B01J 20/28014* (2013.01); *B01J 20/28064* (2013.01); *B01J 20/28071* (2013.01); *B01J 20/28073* (2013.01); *B01J 20/28083* (2013.01); *B01J 20/3071* (2013.01); *B01J 20/3078* (2013.01)

(58) Field of Classification Search
CPC ............ B01J 20/28071; B01J 20/28073; B01J 20/28083; B01J 20/3071; B01J 20/3078; B01J 20/18; B01J 20/183; B01J 20/186; B01J 20/28004; B01J 20/2803; B01J 20/2808; B01J 20/282; B01J 20/30; B01J 20/3085; B01J 20/3007; C07C 7/13; C07C 15/08
See application file for complete search history.

(56) References Cited

U.S. PATENT DOCUMENTS

| | | | | |
|---|---|---|---|---|
| 5,900,523 | A | 5/1999 | Kulprathipanja | |
| 6,137,024 | A | 10/2000 | Zinnen et al. | |
| 2009/0326310 | A1 | 12/2009 | Kulprathipanja et al. | |
| 2012/0227584 | A1 | 9/2012 | Wang et al. | |
| 2017/0158591 | A1* | 6/2017 | Osei-Twum | C07C 45/74 |
| 2018/0280926 | A1 | 10/2018 | Cheng et al. | |

FOREIGN PATENT DOCUMENTS

| | | | | | |
|---|---|---|---|---|---|
| CN | 1939883 | A | | 4/2007 | |
| CN | 106927478 | A | * | 7/2017 | C01B 39/205 |
| CN | 108439427 | A | | 8/2018 | |
| CN | 109692656 | A | | 4/2019 | |
| CN | 110510630 | A | | 11/2019 | |
| CN | 111097370 | A | * | 5/2020 | B01J 20/12 |
| CN | 114425298 | A | | 5/2022 | |
| JP | S49130899 | A | | 12/1974 | |
| JP | 2012513359 | A | | 6/2012 | |
| RU | 2165619 | C1 | | 4/2001 | |
| RU | 2193021 | C2 | | 11/2002 | |
| RU | 2490245 | C2 | | 8/2013 | |
| TW | 201410323 | A | | 3/2014 | |
| TW | 202016021 | A | | 5/2020 | |

OTHER PUBLICATIONS

Khlynina, N. G. et al., "Study of sorption properties of sorbents under static conditions", Bulletin of the Krasnoyarsk State Agrarian University, 2008, No. 1, pp. 92-99.

* cited by examiner

M-XYLENE ADSORBENT AND PREPARATION METHOD THEREFOR

TECHNICAL FIELD

The present invention relates to a molecular sieve adsorbent and a preparation method therefor, in particular to an m-xylene adsorbent and a preparation method therefor.

BACKGROUND TECHNOLOGY m-xylene (MX) is an important basic organic chemical raw material, widely used in synthetic resins, pesticides, pharmaceuticals, coatings, dyes, and other fields. In industry, a highly pure m-xylene is usually obtained by separation from mixed C8 aromatic hydrocarbons containing ethylbenzene, p-xylene, m-xylene and o-xylene using an adsorption and separation technology.

Adsorbents are the foundation and core of the adsorption and separation technology, and their active components are mostly zeolite materials. CN1136549A and U.S. Pat. No. 6,137,024 respectively report adsorbents using Silicalite-1 and hydrogen type β Zeolite as active components, but Silicalite-1, β Zeolite involve a relatively low adsorption capacity such that the application thereof is limited. In contrast, Y molecular sieves have a relatively high adsorption capacity and a broader application prospect.

U.S. Pat. No. 4,306,107 discloses a process for separating xylene and ethylbenzene from mixed C8 aromatic hydrocarbons. In this process, NaY zeolite is used as an active component of the adsorbent, and toluene is used as a desorbent. By taking advantage of the characteristics of NaY zeolite having the strongest adsorption ability for m-xylene, the moderate adsorption capacity for p-xylene and o-xylene, and the weakest adsorption capacity for ethylbenzene, mixed C8 aromatic hydrocarbons are fed into a simulated moving bed for a countercurrent operation, and m-xylene, p-xylene and o-xylene, ethylbenzene are obtained respectively at different positions of the simulated moving bed.

U.S. Pat. No. 4,326,092 discloses a process for the separation of m-xylene from mixed C8 aromatic hydrocarbons. Using NaY zeolite having a silica to alumina molar ratio of from 4.5 to 5.0 to prepare an adsorbent can achieve a higher m-xylene selectivity.

U.S. Pat. No. 5,900,523 reports that using an adsorbent with NaY zeolite having a silica:alumina molar ratio between 4.0 and 6.0 as an active component, which has a water content corresponding to an LOI at 500° C. of 1.5 to 2.5 wt %, achieves good separation results by using indane as a desorbent for a liquid-phase adsorptive separation of m-xylene at 100 to 150° C.

CN1939883A discloses a process for separating m-xylene from isomers of C8 aromatic hydrocarbons. An adsorbent is prepared by using NaY zeolite having a silica:alumina molar ratio of 5 to 6, the zeolite having a water content in the range 0 to 8 wt % and an adsorption temperature from 25 to 250° C., the desorbent being selected from tetraline and its alkylated derivatives.

SUMMARY OF THE INVENTION

The objective of the present invention is to provide an m-xylene adsorbent and a preparation method therefor, wherein the adsorbent is used for adsorptive separation of m-xylene from mixed C8 aromatic hydrocarbons. The adsorbent has the good mass transfer performance, the relatively high m-xylene adsorption selectivity and adsorption capacity.

The m-xylene adsorbent provided by the present invention comprises 94 to 99.9 wt % of a Y molecular sieve and 0.1 to 6 wt % of a matrix, wherein the Y molecular sieve consists of a non-crystal-transformed Y molecular sieve and a Y molecular sieve produced by a crystal transformation, wherein the non-crystal-transformed Y molecular sieve is a mesoporous nano Y molecular sieve which has a crystalline grain size of 20 to 450 nanometers, contains two types of mesoporous pores, and respectively has most probable pore diameters of 5 to 20 nanometers and 25 to 50 nanometers.

The non-crystal-transformed Y molecular sieve in the active component Y molecular sieve of the adsorbent in the present invention is a mesoporous nano Y molecular sieve, which is a self-aggregate formed by self-aggregation of nano-scale Y molecular sieve crystalline grains, and comprises two types of mesoporous pores. The adsorbent is used for adsorptive separation of m-xylene from mixed C8 aromatic hydrocarbons, has the relatively high adsorption selectivity for m-xylene as well as the relatively high adsorption capacity and mass transfer rate, and can significantly improve the treatment ability of the adsorbent for adsorptive separation of raw materials.

SPECIFIC EMBODIMENTS

Figure 1:
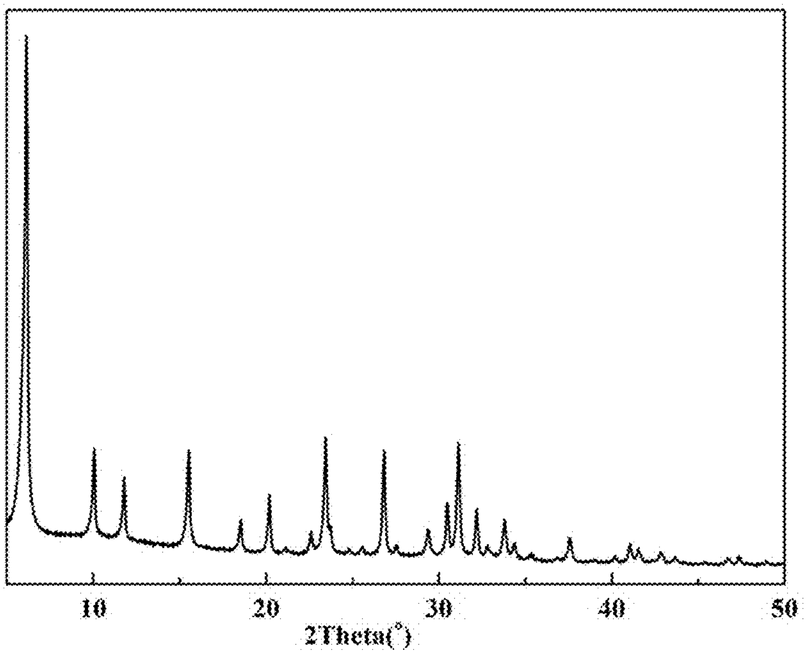
FIG. 1 is an X-ray diffraction (XRD) spectrum of the mesoporous nano Y molecular sieve prepared in Example 1 of the present invention.

The active component Y molecular sieve in the adsorbent of the present invention consists of a non-crystal-transformed Y molecular sieve and a Y molecular sieve produced by a crystal transformation, wherein the non-crystal-transformed Y molecular sieve is a self-aggregate formed by self-aggregation of nano-scale Y molecular sieve crystalline grains, and the self-aggregate has a relatively large particle size. The nano-scale Y molecular sieve is beneficial to improve the mass transfer performance, and a larger particle size of the self-aggregate can better solve the problem of the difficulty in the solid-liquid separation caused by the generation of nano-scale molecular sieve crystalline grains during a molecular sieve synthesis. In addition, the nano Y molecular sieve self-aggregate contains two types of mesoporous pores, which further render a good mass transfer performance, whereas the improvement on the mass transfer performance can further improve the adsorption selectivity of the mesoporous nano Y molecular sieve for m-xylene.

In the present invention, the mesoporous nano Y molecular sieve (non-crystal-transformed Y molecular sieve) is mixed with a kaolin mineral as a binder, a molding aid and a silicon source, then rolled into shape, calcined at a high temperature to convert the kaolin mineral into metakaolin and then convert the metakaolin into a Y molecular sieve through an in-situ crystallization by subjecting to an alkali treatment, and then dried and calcined to obtain an adsorbent.

Preferably, the adsorbent in the present invention comprises 98 to 99.9 wt % of the Y molecular sieve and 0.1 to 2 wt % of the matrix.

The adsorbent in the present invention contains two types of Y molecular sieves: one is a non-crystal-transformed Y molecular sieve, which is a mesoporous nano Y molecular sieve having two types of mesoporous pores, and the other is a binder used in the adsorbent molding process, which is generally a Y molecular sieve formed by an in-situ crystallization of the kaolin mineral and the silicon source added in the molding process. Preferably, the adsorbent comprises 84 to 93 wt % of the non-crystal-transformed Y molecular sieve, 1 to 15.9 wt % of the Y molecular sieve produced by the crystal transformation and 0.1 to 6 wt % of the matrix; more preferably, the adsorbent comprises 84 to 93 wt % of the non-crystal-transformed Y molecular sieve, 5 to 15.9 wt % of the Y molecular sieve produced by the crystal transformation and 0.1 to 2 wt % of the matrix.

The mesoporous nano Y molecular sieve in the present invention is preferably a self-aggregate of the nano-scale Y molecular sieve crystalline grains, the self-aggregate having a particle size of preferably 0.5 to 1.5 microns, and the nano-scale Y molecular sieve crystalline grains in the self-aggregate having a particle size of preferably 20 to 400 nanometers, more preferably 50 to 300 nanometers. The nano Y molecular sieve self-aggregate comprises two types of mesoporous pores and has the most probable pore diameters of 5 to 20 nanometers and 25 to 50 nanometers respectively, preferably 10 to 20 nanometers and 30 to 50 nanometers respectively.

The molar ratio of $SiO_2$/Al2$O_3$ in the mesoporous nano Y molecular sieve is preferably 4.0 to 5.5.

The mesoporous nano Y molecular sieve has a specific surface area of preferably 740 to 1000 $m^2$/g, more preferably 750 to 900 $m^2$/g, a total pore volume of preferably 0.40 to 0.65 $cm^3$/g, more preferably 0.40 to 0.55 $cm^3$/g, a mesoporous pore volume of preferably 0.08 to 0.35 $cm^3$/g, more preferably 0.10 to 0.25 $cm^3$/g.

The matrix in the adsorbent is a residue of the kaolin mineral after the crystal transformation via the in-situ crystallization. The kaolin mineral is preferably selected from at least one of kaolinite, dickite, perlite, ovenstone, and halloysite.

The adsorbent in the present invention is preferably in the form of pellets having a particle size of preferably 300 to 850 microns.

The preparation method of the adsorbent according to the present invention comprises the following steps:

(1) mixing the non-crystal-transformed NaY molecular sieve, a kaolin mineral, a silicon source and a molding aid evenly, rolling into pellets, calcining at 530-600° C. after drying, wherein a weight ratio of the non-crystal-transformed NaY molecular sieve to the kaolin mineral is 85-94:6-15, and a weight ratio of silicon dioxide contained in the added silicon source to the kaolin mineral is 0.1-3.6;

(2) subjecting the pellets obtained after the calcining in step (1) to an in-situ crystallization with sodium hydroxide or a mixed solution of sodium hydroxide and water glass at 85 to 100° C., such that the kaolin mineral therein is in-situ crystallized into a Y molecular sieve, then washed and dried.

Step (1) of the above method is to mix the non-crystal-transformed NaY molecular sieve, the kaolin mineral, the silicon source and the molding aid before rolling into shape. The crystallization substance contained in the kaolin mineral is preferably selected from kaolinite, dickite, perlite, ovenstone, halloysite, or mixtures thereof. The weight percentage of the crystallization substance in the kaolin mineral is at least 90%.

The silicon source in step (1) is preferably selected from one or more of ethyl orthosilicate, silica sol, water glass, sodium silicate, silica gel, and white carbon black. Preferably, the weight ratio of silicon dioxide contained in the added silicon source to the kaolin mineral is 0.2 to 3.0. The molding aid is preferably selected from at least one of lignin, *sesbania* powder, dry starch, carboxymethyl cellulose and activated carbon. The addition amount of the molding aid is preferably 1 to 6 wt % of the total amount of solid powder.

The molding method in step (1) is preferably the rolling into shape or the spraying molding. For the rolling-into-shape method, the device used can be a rotary table, a coating pan, or a roller. During rolling into shape, the uniformly mixed solid powder is placed in a rotating device, and the solid powder is adhered and agglomerated into pellets by spraying water while rolling. The amount of water used during the rolling is preferably 6 to 30%, more preferably 6 to 20%, of the total weight of solid. When the added silicon source is a solid, it can be mixed with the non-crystal-transformed NaY molecular sieve, the kaolin mineral; when the added silicon source is a liquid, it can be mixed with the non-crystal-transformed NaY molecular sieve, the kaolin mineral, or can also be added to the water used for the rolling into shape, or the silicon source is added in both the solid powder and the water.

The pellets formed by rolling in step (1) are sieved, pellets having a certain range of particle size, preferably pellets having a particle size of 300-850 microns, are taken, dried and calcined. The drying temperature is preferably 60 to 110° C., the time is preferably 2 to 12 hours; the calcining temperature is preferably 530 to 700° C., the time is preferably 1 to 6 hours. After the calcining, the kaolin mineral in the pellets is converted into metakaolin in order to crystal-transform into the NaY molecular sieve in step (2).

Step (2) of the above method is an in-situ crystallization of the pellets after molding. The in-situ crystallization can be carried out in a sodium hydroxide solution or a mixed solution of sodium hydroxide and water glass. The liquid/solid ratio during the in-situ crystallization is preferably 1.5 to 5.0 L/kg, the in-situ crystallization temperature is preferably 90 to 100° C., and the time is preferably 0.5 to 8 hours.

When a sodium hydroxide solution is used for the in-situ crystallization in step (2), the concentration of hydroxide ions in the sodium hydroxide solution used is preferably 0.1 to 3.0 mol/L, more preferably 0.5 to 1.5 mol/L; when a mixed solution of sodium hydroxide and water glass is used for the in-situ crystallization, the content of sodium oxide is preferably 2 to 10 wt %, and the content of silicon dioxide is preferably 1 to 6 wt %. After washing and drying the in-situ crystallized adsorbent, a spherical adsorbent is obtained. The drying temperature is preferably 70 to 110° C., the drying time is preferably 2 to 20 hours.

The preparation method of the non-crystal-transformed NaY molecular sieve in step (1) of the present invention comprises the following steps:

(I) taking a silicon source and an aluminum source at 0-5° C., adding sodium hydroxide and water to form a molecular sieve synthesis system by mixing evenly, wherein the molar ratios of the respective components are $SiO_2/Al_2O_3$=5.5-9.5, $Na_2O/SiO_2$=0.1-0.3, $H_2O/SiO_2$=5-25, the temperature of the synthesis system is 1-8° C., (II) statically ageing the molecular sieve synthesis system of step (I) at 20 to 40° C. for 10 to 48 hours, then statically crystallizing at 90 to 150° C. for 2 to 10 hours, stirring for 2 to 10 minutes, statically crystallizing for continued 11 to 20 hours, washing and drying a resulting solid.

The step (I) of the above method is to prepare a molecular sieve synthesis system at a low temperature: using a silicon source and an aluminum source at 0-5° C., preferably 0-4° C., and then adding sodium hydroxide and water to prepare a molecular sieve synthesis system. The molar ratios of the respective components in the molecular sieve synthesis system are preferably: $SiO_2/Al_2O_3$=7-9, $Na_2O/SiO_2$=0.1-0.25, $H_2O/SiO_2$=8-20. The temperature of the synthesis system is preferably 1 to 5° C.

The step (II) of the above method involves crystallizing the molecular sieve synthesis system to prepare the molecular sieve, preferably, the molecular sieve synthesis system is statically aged at 20 to 40° C. for 15 to 30 hours, then statically crystallized at 90 to 120° C. for 4 to 9 hours, stirred for 2 to 10 minutes, statically crystallized for continued 11 to 15 hours. The solid obtained after crystallization is washed and dried to obtain a mesoporous nano Y molecular sieve. The drying temperature is preferably 70 to 100° C., more preferably 75 to 90° C., the drying time is preferably 2 to 20 hours, more preferably 8 to 16 hours.

The aluminum source in step (I) of the above method is preferably selected from one or more of a low alkalinity sodium metaaluminate solution, aluminum oxide, aluminum hydroxide, aluminum sulfate solution, aluminum chloride, aluminum nitrate and sodium aluminate, more preferably the low alkalinity sodium metaaluminate solution and/or the aluminum sulfate solution. The content of $Al_2O_3$ in the low alkalinity sodium metaaluminate solution is preferably 17 to 28 wt %, and the content of $Na_2O$ is preferably 19 to 30 wt %, the molar ratio of $Na_2O$ to $Al_2O_3$ contained in the low alkalinity sodium metaaluminate solution is preferably 1.7 to 2.5, more preferably 1.7 to 2.2. When the aluminum source is selected from the low alkalinity sodium metaaluminate solution and the aluminum sulfate solution, the weight ratio of the aluminum sulfate solution to the low alkalinity sodium metaaluminate solution is 1 to 6:1, and the aluminum contained in the aluminum sulfate solution is calculated based on $Al_2O_3$, wherein the content of $Al_2O_3$ is preferably 5 to 15 wt %.

The silicon source in step (I) is preferably silica sol or water glass. The $SiO_2$ content in the water glass is preferably 25 to 38 wt %, and the $Na_2O$ content is preferably 9 to 15 wt %.

The adsorbent in the present invention is suitable for adsorptive separation of m-xylene from mixed C8 aromatic hydrocarbons.

The adsorption selectivity and the adsorption and desorption rate of the target adsorption component are important indicators for evaluating the performance of the adsorbent. The selectivity is a ratio of the concentration ratio of the two components in the adsorbed phase to the concentration ratio of the two components in the non-adsorbed phase at the adsorption equilibrium. The adsorption equilibrium refers to a state where there is no net transfer of components between the adsorbed phase and the non-adsorbed phase after the mixed C8 aromatic hydrocarbons come into contact with the adsorbent. The calculation equation for the adsorption selectivity is as follows:

$$\beta = \frac{A_C/A_D}{U_C/U_D}$$

where C and D represent two components to be separated, $A_C$ and $A_D$ represent respectively the concentrations of two components C and D in the adsorbed phase at the adsorption equilibrium, and $U_C$ and $U_D$ respectively represent the concentrations of two components C and D in the non-adsorbed phase at the adsorption equilibrium. When the selectivity of two components β=1.0, it indicates that the adsorption ability of the adsorbent for the two components is equivalent and there is no component that is preferentially adsorbed. Whenβis greater than or less than 1.0, it indicates that one component is preferentially adsorbed. Specifically, when β>1.0, the adsorbent preferentially adsorbs component C; when β <1.0, the adsorbent preferentially adsorbs component D. In terms of the difficulty of separation, the larger the β value is, the easier the adsorption separation is. The lager adsorption and desorption rates are conducive to reducing the amounts of the adsorbent and the desorbent used, improving the product yield, and reducing the operating costs of the adsorption and separation device.

The present invention uses a dynamic pulse experimental device to measure the adsorption selectivity and the adsorption and desorption rate of m-xylene. The device consists of a feeding system, an adsorption column, a heating furnace, and a pressure control valve and the like. The adsorption column is Φ6×1800 mm stainless steel tube with an adsorbent capacity of 50 ml. The lower inlet of the adsorption column is connected to the feed and nitrogen system, the upper outlet is connected to the pressure control valve and then connected to the effluent collector. The desorbent used in the experiment consists of 30% by volume of toluene (T) and 70% by volume of n-heptane ($NC_7$), and the pulse liquid consists of 5% by volume of the respective ethylbenzene (EB), p-xylene (PX), m-xylene (MX), o-xylene (OX), n-nonane ($NC_9$), and 75% by volume of the above desorbent.

A method for determining the adsorption selectivity is: filling the weighed adsorbent into the adsorption column, shaking and compacting, dehydrating and activating in a nitrogen stream at 160-280° C., then feeding the desorbent to remove the gas from the system, raising the pressure to 0.8 MPa, and raising the temperature to 145° C., stopping the feeding of the desorbent, feeding 8 ml of a pulsed feed liquid at a volume space velocity of 1.0 $h^{-1}$, then stopping the feeding of the pulsed liquid, and feeding the desorbent at the same space velocity for desorption, taking 3 drops of desorption liquid samples every 2 minutes, and analyzing the constitution by a gas chromatography. By using the feed volume of the desorbent for desorption as x-coordinate, and the concentrations of the respective $NC_9$ and EB, PX, MX, and OX components as y-coordinate, the desorption curve for the above respective components is drawn. As a tracer, $NC_9$ is not adsorbed and peaks firstly, giving the dead space of the adsorption system. By using the midpoint of the half peak width of the tracer as zero point, the desorbent feed volumes from the midpoint of the half peak width of the respective components of EB, PX, MX and OX to the zero point, namely the net retention volume $V_R$, are measured. The ratio of the net retention volumes of the two components is the adsorption selectivity β. For example, the ratio of the net retention volume of MX to the net retention volume of EB is the adsorption selectivity of MX relative to EB, which is marked as $\beta_{MX/EB}$.

In order to achieve continuous and cyclic use of the adsorbent, the selectivity between the extraction component and the desorbent is also an important performance indicator, which can be determined through further analysis of the desorption curve of the extraction component in the pulse test. The volume of the desorbent required when the concentration of MX in the effluent at the front of the pulse desorption curve of MX rises from 10% to 90% is defined as the adsorption rate $[S_A]_{10-90}$, and the volume of the desorbent required when the concentration of MX decreases from 90% to 10% at the rear of the desorption curve is defined as the desorption rate $[S_D]_{90-10}$. The ratio of both $[S_D]_{90-10}/[S_A]_{10-90}$ can characterize the adsorption selectivity between MX and the desorbent (T) $\beta_{MX/T}$. If $\beta_{MX/T}$ is far less than 1.0, it indicates that the adsorbent has too strong an adsorption ability for the desorbent, which is detrimental to the adsorption process. If $\beta_{MX/T}$ is much greater than 1.0, it indicates that the adsorption ability for the desorbent is too weak, which would make the desorption process difficult. The ideal case is that $\beta_{MX/T}$ is approximately equal to 1.0.

The present invention is further explained by the examples below but is not limited thereto.

In the Examples and the Comparative Examples, the method for determining the physical parameters of the adsorbent is provided as follows:

The compression strength of the adsorbent is expressed by the crushing rate of the pellet adsorbent under a certain pressure. The lower the crushing rate is, the higher the compression strength is. A method for determining the compression strength of adsorbent is: measure with a DL-II particle strength tester (produced by China Haohua (Dalian) Research & Design Institute of Chemical Industry Co. Ltd), and after passing the adsorbent pellet through a 300 micron sieve, fill about 1.5 ml of the adsorbent into a stainless steel cylinder. During the measurement, install a thimble that is in an interference fit with the stainless steel cylinder, pour out the adsorbent after pressing once under a preset pressure, and weigh after sieving through a 300 micron sieve. The weight reduction amount of the adsorbent before and after the pressurization test is the crushing rate of the adsorbent at the set pressure.

The adsorption capacity of the molecular sieve or the adsorbent is measured by a toluene vapor phase adsorption experiment. The specific operation method is: to contact toluene-carrying nitrogen (with a toluene partial pressure of 0.05 MPa) with a certain weight of the adsorbent at 35° C. until the toluene reaches an adsorption equilibrium. The adsorption capacity of the tested adsorbent is calculated according to the following equation based on the weight difference of the adsorbent before and after the toluene adsorption.

$$C = \frac{m_2 - m_1}{m_1} \times 1000$$

wherein C is the adsorption capacity, in milligrams per gram; $m_1$ is the weight of the adsorbent tested before adsorbing toluene, in grams; $m_2$ is the weight of the adsorbent tested after adsorbing toluene, in grams.

A method for determining the calcined bulk density of adsorbent is: adding 50 mL of the adsorbent to a 100 mL measuring cylinder, vibrating for 5 minutes on a tap density meter (produced by Liaoning Instrument Research Institute Co., Ltd.), and then adding 50 mL of the adsorbent and vibrating for 5 minutes, the ratio of weight to volume of the adsorbent in the measuring cylinder is the adsorbent bulk density; taking a certain weight of the adsorbent and calcining at 600° C. for 2 hours, placing in a dryer to cool down to room temperature, the weight ratio of the adsorbent after and before the calcination is the calcined base, and the product of the calcined base and the adsorbent bulk density is the calcined bulk density.

The specific surface area, the total pore volume, the micropore pore volume, and the mesoporous pore volume of the molecular sieve are determined in accordance with ASTMD4365-95 (2008).

Example 1

(1) Preparation of Aluminum Sources

By adding 200 kg of aluminum hydroxide, 181.52 kg of sodium hydroxide, and 214.84 kg of deionized water to a reactor, heating to 100° C., and stirring for 6 hours, a clear and transparent low alkalinity sodium metaaluminate solution was formed as an aluminum source 1. The content of $Al_2O_3$ in the aluminum source 1 was 21.58 wt %, the content of $Na_2O$ was 23.59 wt %, and the molar ratio of $Na_2O$ to $Al_2O_3$ was 1.80. Dissolving 87.89 kg of aluminium sulfate octadecahydrate in 112.11 kg of water and stirring for 1 hour, a clear and transparent aluminum sulfate solution was obtained as an aluminum source 2. The content of $Al_2O_3$ in the aluminum source 2 was 6.73 wt %.

(2) Raw Material Pretreatment

A water glass (having a $SiO_2$ content of 37.17 wt %, a $Na_2O$ content of 11.65 wt %) and the aluminum sources prepared in step (1) were cooled to 0° C. respectively.

(3) Preparation of Y Molecular Sieve

Under a stirring condition, 89.68 kg of the water glass at 0° C., 49.79 kg of the aluminum sulfate solution at 0° C., 18.14 kg of the low alkalinity sodium metaaluminate solution at 0° C., which have undergone the temperature reduction treatment in step (2), and 5.61 kg of deionized water were added to a reactor to obtain a Y molecular sieve synthesis system, wherein the molar ratios of the respective components were $SiO_2/Al_2O_3$=7.8, $Na_2O/SiO_2$=0.25, $H_2O/SiO_2$=10. The temperature of the synthesis system was 3° C.

Figure 2:
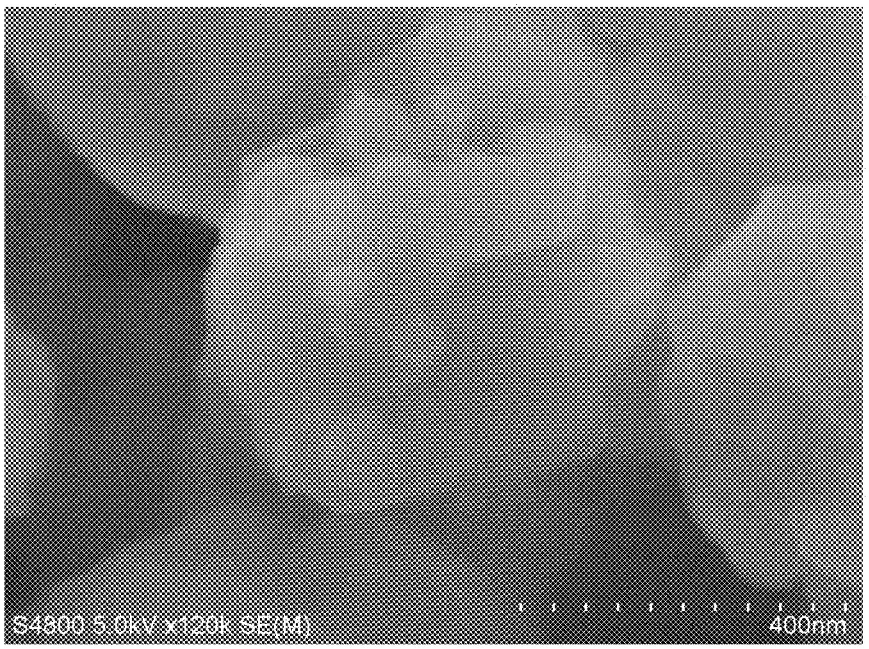
FIG. 2 is a scanning electron microscope (SEM) image of the mesoporous nano Y molecular sieve prepared in Example 1 of the present invention.
Figure 3:
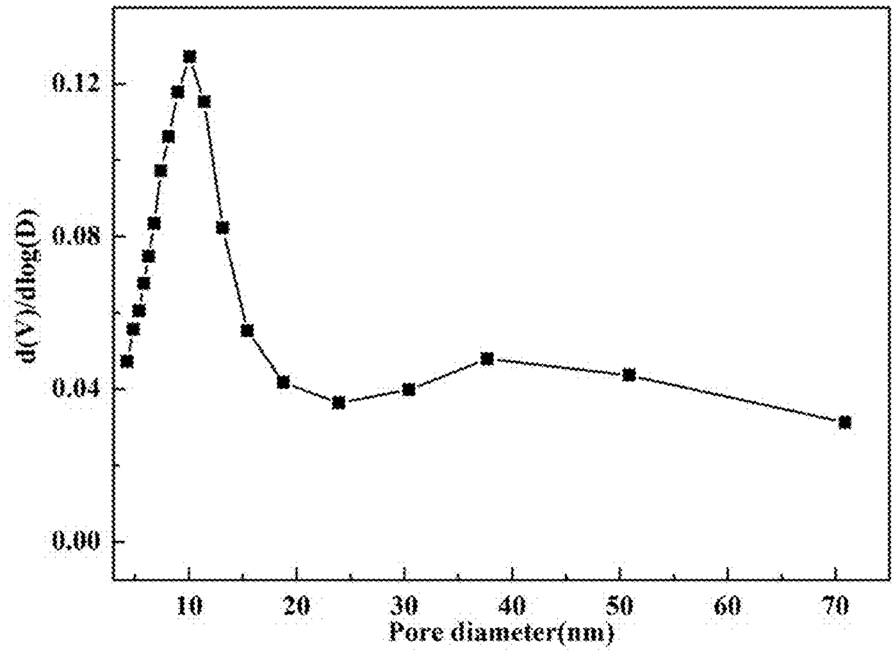
FIG. 3 is the pore size distribution curve of the mesoporous nano Y molecular sieve prepared in Example 1 of the present invention.

The above molecular sieve synthesis system was transferred to an airtight reactor, statically aged at 30° C. for 24 hours, further heated to 100° C. for a static crystallization for 8 hours, stirred for 5 minutes, and statically crystallized for continued 12 hours, filtrated, and the resulting solid was washed with deionized water until the pH of the filtrate was 8 to 9, and dried at 80° C. for 12 hours to obtain a nano Y molecular sieve a having a $SiO_2/Al_2O_3$ molar ratio of 4.6 (analyzed with X-ray fluorescence spectroscopy, the same below). See FIG. 1 for the XRD spectrum, see FIG. 2 for the SEM image, and see FIG. 3 for the pore size distribution curve. As can be seen from FIG. 2, the nano-scale Y molecular sieve crystalline grains self-assemble to form the self-aggregate with a particle size of 0.6 microns, and the nano-scale Y molecular sieve crystalline grains have a particle size of 60 to 150 nanometers. FIG. 3 shows that the most probable pore diameters of the nano Y molecular sieve a are 10 nanometers and 37 nanometers respectively. See Table 1 for specific surface area, the total pore volume, the microporous and mesoporous pore volumes, and the toluene adsorption capacity.

Example 2

Figure 4:
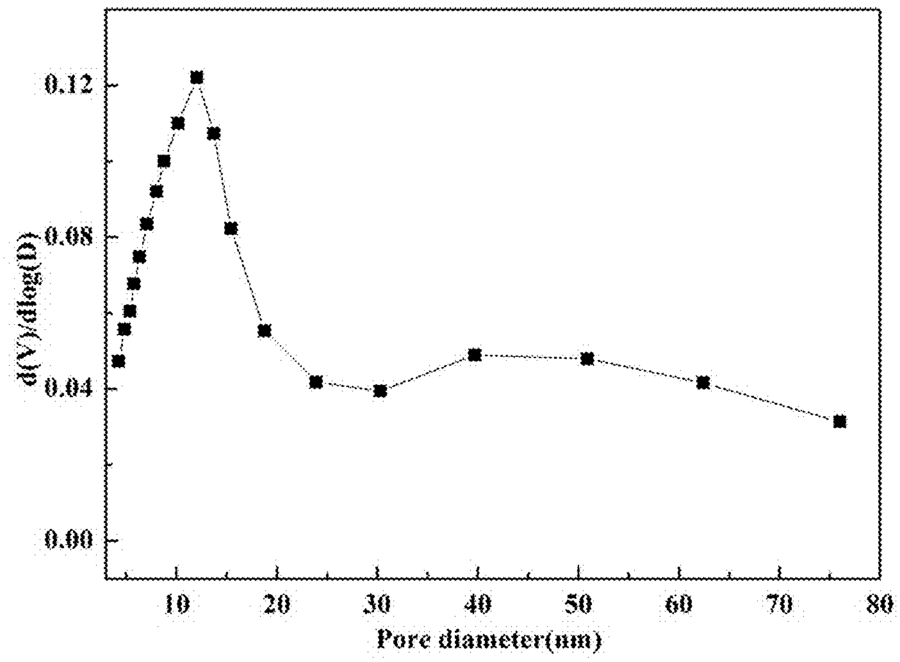
FIG. 4 is the pore size distribution curve of the mesoporous nano Y molecular sieve prepared in Example 2 of the present invention.

A Y molecular sieve was prepared according to the method in Example 1 except that in step (3), 89.68 kg of the water glass at 0° C., 53.29 kg of the aluminum sulfate solution at 0° C., 17.04 kg of the low alkalinity sodium metaaluminate solution at 0° C., which have undergone the temperature reduction treatment in step (2), and 3.50 kg of deionized water were added to a reactor under a stirring condition to obtain a Y molecular sieve synthesis system, wherein the molar ratios of the respective components were $SiO_2/Al_2O_3$=7.8, $Na_2O/SiO_2$=0.23, $H_2O/SiO_2$=10. The temperature of the synthesis system was 4° C. The above molecular sieve synthesis system was transferred to an airtight reactor and subjected to a static aging and a two-stage static crystallization with stirring in the middle. The resulting solid was washed with deionized water and dried to obtain a nano Y molecular sieve b, which has a $SiO_2/Al_2O_3$ molar ratio of 4.8. The particle size of the self-aggregate formed from the nano-scale Y molecular sieve crystalline grains was 0.8 microns, and the particle size of the nano Y molecular sieve crystalline grains was 80-180 nanometers. The pore size distribution curve is shown in FIG. 4. The most probable pore diameters are 12 nanometers and 40 nanometers respectively. See Table 1 for the specific surface area, the total pore volume, the microporous and mesoporous pore volumes, and the toluene adsorption capacity.

Example 3

Figure 5:
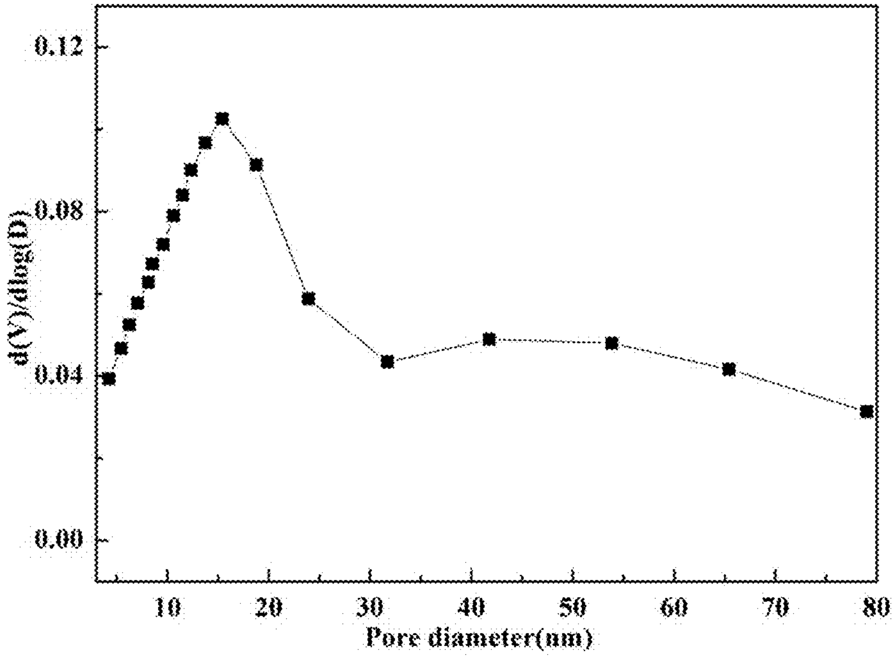
FIG. 5 is the pore size distribution curve of the mesoporous nano Y molecular sieve prepared in Example 3 of the present invention.

A Y molecular sieve was prepared according to the method in Example 1 except that in step (3), 89.68 kg of the water glass at 0° C., 58.56 kg of the aluminum sulfate solution at 0° C. and 15.04 kg of the low alkalinity sodium metaaluminate solution at 0° C., which have undergone the temperature reduction treatment in step (2), and 0.32 kg of deionized water were added to a reactor under a stirring condition to obtain a Y molecular sieve synthesis system, wherein the molar ratios of the respective components were $SiO_2/Al_2O_3$=7.8, $Na_2O/SiO_2$=0.20, $H_2O/SiO_2$=10. The temperature of the synthesis system was 5° C. The above molecular sieve synthesis system was transferred to an airtight reactor and subjected to a static aging and a two-stage static crystallization with stirring in the middle. The resulting solid was washed with deionized water and dried to obtain a nano Y molecular sieve c, which has a $SiO_2/Al_2O_3$ molar ratio of 4.9. The particle size of the self-aggregate formed from the nano-scale Y molecular sieve crystalline grains was 1.0 microns, and the particle size of the nano Y molecular sieve crystalline grains was 90-200 nanometers. The pore size distribution curve is shown in FIG. 5. The most probable pore diameters are 15 nanometers and 42 nanometers respectively. See Table 1 for the specific surface area, the total pore volume, the microporous and mesoporous pore volumes, and the toluene adsorption capacity.

Example 4

Figure 6:
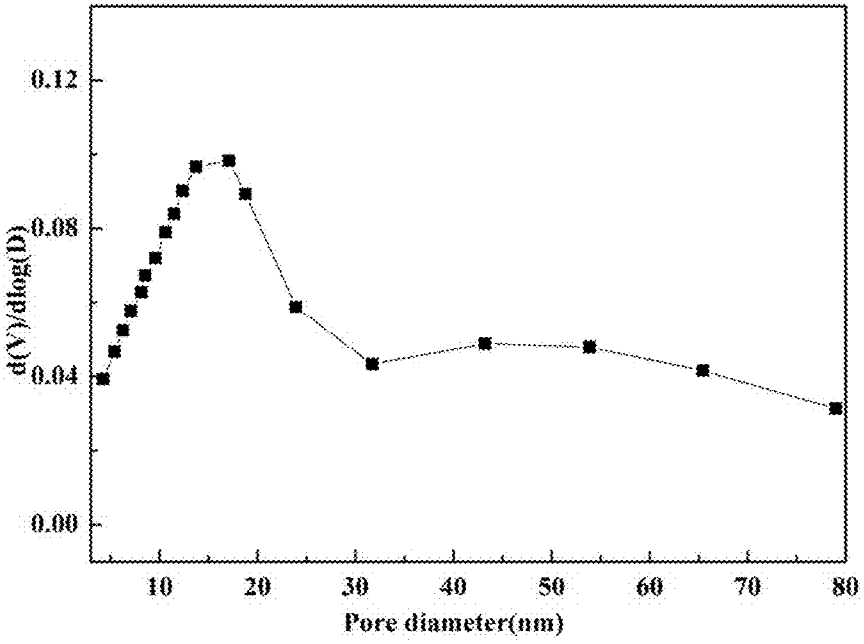
FIG. 6 is the pore size distribution curve of the mesoporous nano Y molecular sieve prepared in Example 4 of the present invention.

A Y molecular sieve was prepared according to the method in Example 1 except that in step (3), 59.79 kg of the water glass at 0° C., 39.05 kg of the aluminum sulfate solution at 0° C., 10.27 kg of the low alkalinity sodium metaaluminate solution at 0° C., which have undergone the temperature reduction treatment in step (2), and 33.54 kg of deionized water were added to a reactor under a stirring condition to obtain a Y molecular sieve synthesis system, wherein the molar ratios of the respective components were $SiO_2/Al_2O_3$=7.8, $Na_2O/SiO_2$=0.20, $H_2O/SiO_2$=15. The temperature of the synthesis system was 4° C. The above molecular sieve synthesis system was transferred to an airtight reactor and subjected to a static aging and a two-stage static crystallization with stirring in the middle. The resulting solid was washed with deionized water and dried to obtain a nano Y molecular sieve d, which has a $SiO_2/Al_2O_3$ molar ratio of 4.9. The particle size of the self-aggregate formed from the nano Y molecular sieve crystalline grains was 1.1 microns, and the particle size of the nano Y molecular sieve crystalline grains was 90-220 nanometers. The pore size distribution curve is shown in FIG. 6. The most probable pore diameters are 17 nanometers and 43 nanometers respectively. See Table 1 for the specific surface area, total pore volume, the microporous and mesoporous pore volumes, and the toluene adsorption capacity.

Example 5

Figure 7:
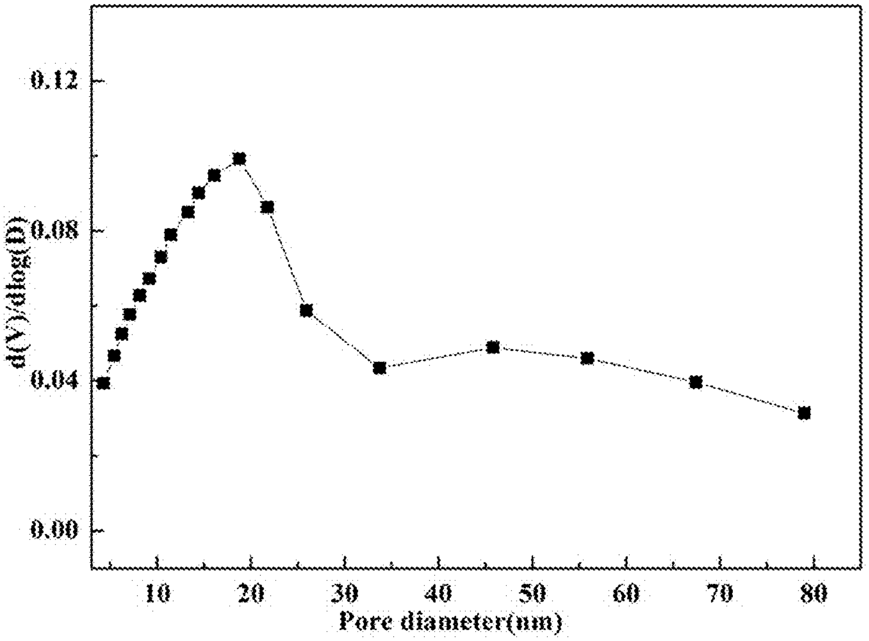
FIG. 7 is the pore size distribution curve of the mesoporous nano Y molecular sieve prepared in Example 5 of the present invention.

A Y molecular sieve was prepared according to the method in Example 1 except in step (3), 44.84 kg of the water glass at 0° C., 29.29 kg of the aluminum sulfate solution at 0° C., 7.7 kg of the low alkalinity sodium metaaluminate solution at 0° C., which have undergone the temperature reduction treatment in step (2), and 50.16 kg of deionized water were added to a reactor under a stirring condition to obtain a Y molecular sieve synthesis system, wherein the molar ratios of the respective components were $SiO_2/Al_2O_3$=7.8, $Na_2O/SiO_2$=0.20, $H_2O/SiO_2$=20. The temperature of the synthesis system was 5° C. The above molecular sieve synthesis system was transferred to an airtight reactor and subjected to a static aging and a two-stage static crystallization with stirring in the middle. The resulting solid was washed with deionized water and dried to obtain a nano Y molecular sieve e, which has a $SiO_2/Al_2O_3$ molar ratio of 5.0. The particle size of the self-aggregate formed from the nano Y molecular sieve crystalline grains was 1.2 microns, and the particle size of the nano Y molecular sieve crystalline grains was 100-240 nanometers. The pore size distribution curve is shown in FIG. 7. The most probable pore diameters are 19 nanometers and 46 nanometers respectively. See Table 1 for the specific surface area, the total pore volume, the microporous and mesoporous pore volumes, and the toluene adsorption capacity.

Comparative Example 1

(1) Preparation of Aluminum Source

By adding 200 kg of aluminum hydroxide, 232.15 kg of sodium hydroxide, and 652.33 kg of deionized water to a reactor, heating to 100° C., and stirring for 6 hours, a clear and transparent low alkalinity sodium metaaluminate solution was formed as an aluminum source. The content of $Al_2O_3$ in the aluminum source was 11.87 wt %, the content of $Na_2O$ was 16.59 wt %, and the molar ratio of $Na_2O$ to $Al_2O_3$ was 2.3.

(2) Preparation of Directing Agent

Under a stirring condition, 3.81 kg of sodium hydroxide, 8.86 kg of deionized water, 4.48 kg of the aluminum source prepared in step (1) and 23.24 kg of water glass (having a $SiO_2$ content of 20.17 wt % and a $Na_2O$ content of 6.32 wt %) were added to a reactor, wherein the molar ratios of the respective components were $SiO_2/Al_2O_3$=15, $Na_2O/SiO_2$=1.07, $H_2O/SiO_2$=21, and a directing agent was obtained by standing at 35° C. for 16 hours.

(3) Preparation of Y Molecular Sieve

Under a stirring condition, 50.74 kg of water glass, 42.51 kg of deionized water, 7.56 kg of the directing agent prepared in step (2), 8.66 kg of the aluminum sulfate solution in step (1) of Example 1 and 11.01 kg of the low alkalinity sodium metaaluminate solution prepared in step (1) were added to a reactor to obtain a Y molecular sieve synthesis system, wherein the molar ratios of the respective components were $SiO_2/Al_2O_3$=9.5, $Na_2O/SiO_2$=0.43, $H_2O/SiO_2$=30, the molar ratio of $Al_2O_3$ contained in the directing agent to $Al_2O_3$ contained in the Y molecular sieve synthesis system was 5%, and the temperature of the synthesis system was 35° C.

Figure 8:
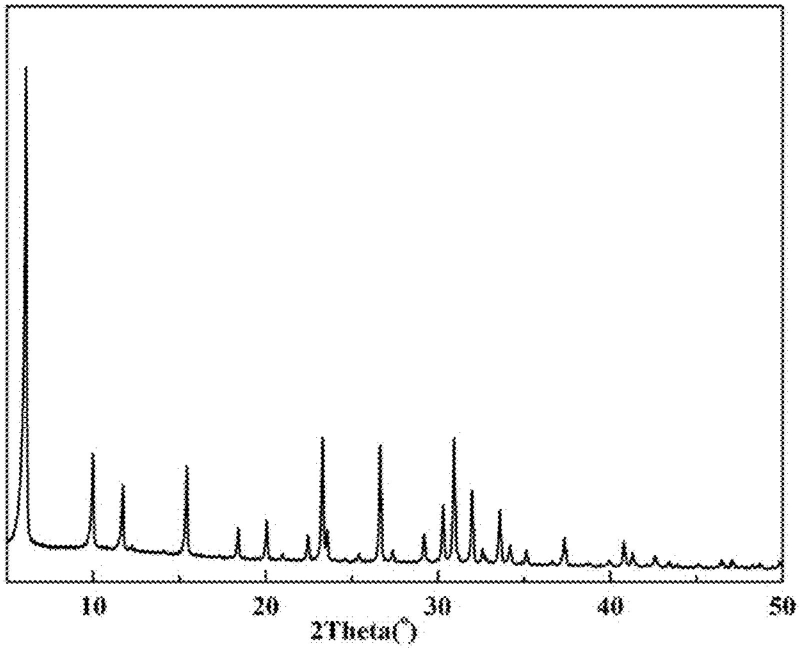
FIG. 8 is an XRD spectrum of the Y molecular sieve prepared in Comparative Example 1.
Figure 9:
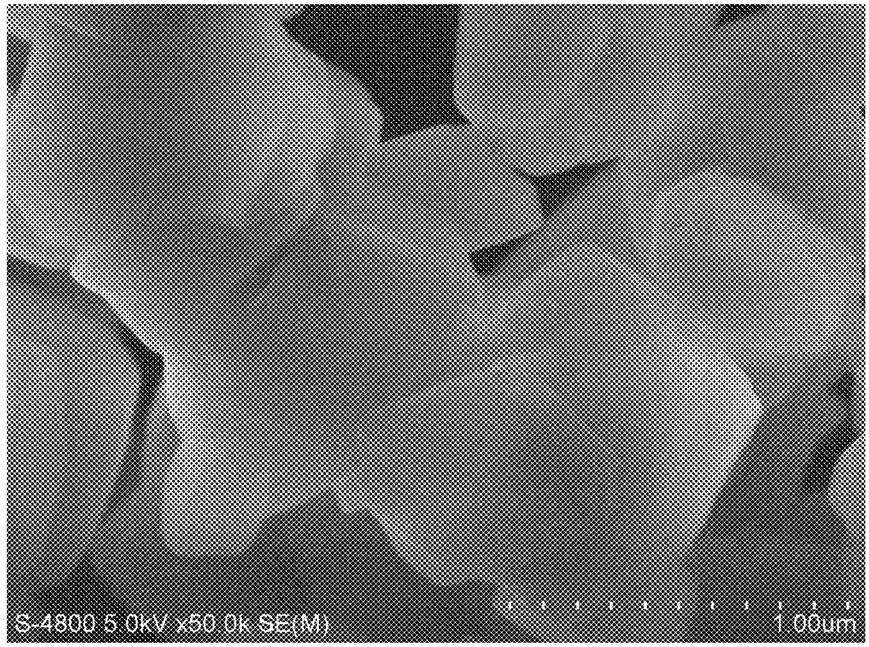
FIG. 9 is a SEM image of the Y molecular sieve prepared in Comparative Example 1.
Figure 10:
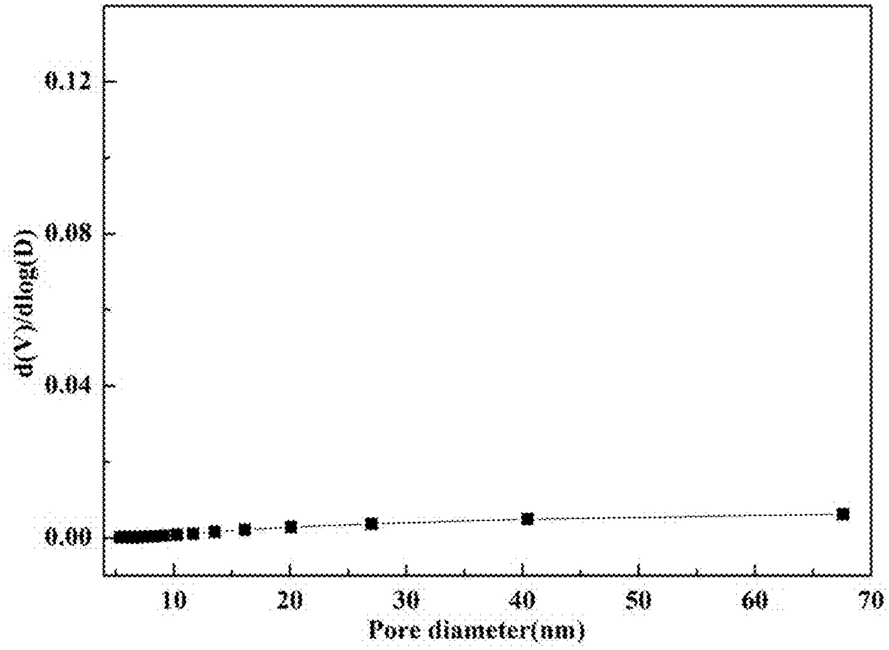
FIG. 10 is the pore size distribution curve of the Y molecular sieve prepared in Comparative Example 1.

The above molecular sieve synthesis system was transferred to an airtight reactor, heated to 100° C. for a hydrothermal crystallization for 28 hours, filtered, and the resulting solid was washed with deionized water until the filtrate had a pH=8-9, dried at 80° C. for 12 hours to obtain a Y molecular sieve f, which has a $SiO_2/Al_2O_3$ molar ratio of 4.8. See FIG. 8 for the XRD spectrum and see FIG. 9 for the SEM image. The particle size of the Y molecular sieve was 0.9 microns. The pore size distribution curve is shown in FIG. 10, indicating that there are no obvious mesopores. See Table 1 for its specific surface area, total pore volume, microporous and mesoporous pore volumes and toluene adsorption capacity.

Comparative Example 2

Preparation of Y Molecular Sieve Using Conventional Method without Directing Agent Dissolving 5.0 kg of sodium aluminate (containing 30 wt % of $Na_2O$, 44.1 wt % of $Al_2O_3$, 25.9 wt % of $H_2O$) and 27.3 kg of sodium hydroxide in 219 kg of water, stirring for 1 hour to obtain a clear solution, adding 124.2 kg of silica sol (containing 29.5 wt % of $SiO_2$) under a stirring condition, and stirring for continued 0.5 hour to obtain a uniformly mixed synthesis system, wherein the molar ratios of the respective components were $SiO_2/Al_2O_3$=28.2, $Na_2O/SiO_2$=0.6, $H_2O/SiO_2$=28.7. The above synthesis system was transferred to an airtight reactor, heated to 120° C. for a hydrothermal crystallization for 3 hours, filtered, and the resulting solid was washed with deionized water until the pH of the filtrate was 8 to 9, dried at 80° C. for 12 hours to obtain a Y molecular sieve g, which has a $SiO_2/Al_2O_3$ molar ratio of 3.8. See Table 1 for the specific surface area, the total pore volume, the microporous and mesoporous pore volumes, and the toluene adsorption capacity.

Comparative Example 3

Preparation of Single Mesoporous NaY Molecular Sieve According to Example 1 of CN109692656A Taking 10.9 kg of sodium metaaluminate solution (containing 17.3 wt % of $Al_2O_3$ and 21.0 wt % of $Na_2O$), 48.3 kg of deionized water and 13.1 kg of sodium hydroxide, stirring to completely dissolve the solid base, then adding 66.8 kg of water glass (containing 28.3 wt % of $SiO_2$ and 8.8 wt % of $Na_2O$), stirring until being evenly mixed, and allowing to stand and age at 25° C. for 20 hours to prepare a directing agent, wherein the molar ratios of the respective components were $SiO_2/Al_2O_3$=17, $Na_2O/SiO_2$=0.95, $H_2O/SiO_2$=17.6.

Taking 187.2 kg of water glass, 464.5 kg of deionized water and 16.3 kg of sodium hydroxide, stirring and mixing sufficiently at 25° C., and adding 90.6 kg of sodium metaaluminate while stirring, then adding 0.9 kg of the directing agent, stirring evenly, adding 8.2 kg of a poly dimethyl diallyl ammonium chloride (R) aqueous solution with a concentration of 20 wt % as a template solution (the poly dimethyl diallyl ammonium chloride has a molecular weight of 100000 to 200000), keep stirring until the mixture was uniform and a synthesis system was obtained, wherein the molar ratios of the respective components were $SiO_2/Al_2O_3$=5.8, $Na_2O/SiO_2$=0.88, $H_2O/SiO_2$=31, the weight ratio of $R/SiO_2$ was 0.03, and the amount of the directing agent added, based on $SiO_2$ therein, was 0.2% of the weight of $SiO_2$ in the synthesis system.

Figure 11:
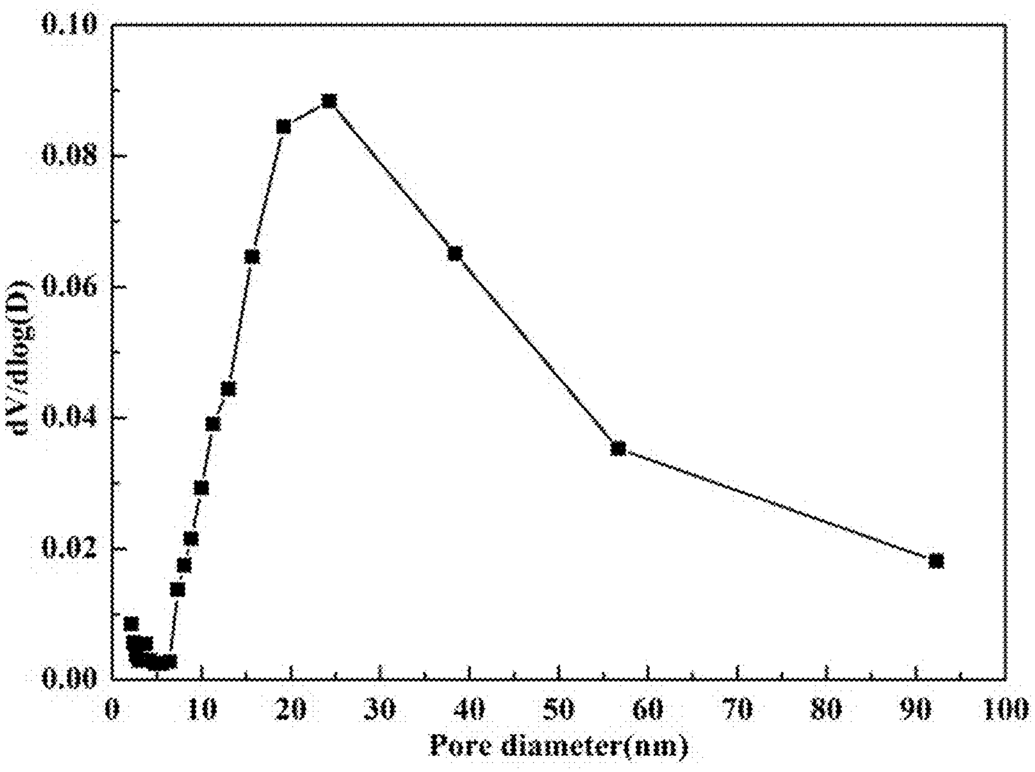
FIG. 11 is the pore size distribution curve of the Y molecular sieve prepared in Comparative Example 3.

The above synthesis system was heated to 100° C. and was subjected to a hydrothermal crystallization under a static condition for 8 hours. The crystallization product was washed with deionized water until the pH value of the washing solution was less than 10. The resulting solid was dried at 80° C. for 12 hours, subjected to a primary calcining at 200° C. for 1 hour in an atmosphere of air, a secondary calcining at 380° C. for 1 hour, and a tertiary calcining at 540° C. for 4 hours to obtain a mesoporous NaY molecular sieve h, which has a $SiO_2/Al_2O_3$ molar ratio of 5.1, a crystalline grain size of 1.3 microns. The pore size distribution curve is shown in FIG. 11, indicating a single mesopore. See Table 1 for its specific surface area, total pore volume, microporous and mesoporous pore volumes and toluene adsorption capacity.

Example 6

Preparation of the Adsorbent of the Present Invention and Test of its Adsorption Performance (1) rolling into shape: mixing 92 kg (calcined weight, the same below) of the nano NaY molecular sieve a prepared in Example 1 with 8 kg of kaolin (containing 90 wt % of kaolinite), 3 kg of white carbon black, and 3 kg of *sesbania* powder evenly, placing it in a rotary table, and spraying an appropriate amount of deionized water while rolling to aggregate the solid powder into pellets. The amount of water sprayed during rolling was 8 wt % of the solid powder, and the weight ratio of silicon dioxide contained in the white black carbon to kaolin was 0.3. After sieving, pellets having a particle size of 300-850 μm were taken, dried at 80° C. for 10 hours, and calcined at 540° C. for 4 hours.

(2) in-situ crystallization: 64 kg of the calcined pellets in step (1) was placed in a 200-liter mixed solution of sodium hydroxide and water glass (having a $SiO_2$ content of 20.17 wt % and a $Na_2O$ content of 6.32 wt %) for an in-situ crystallization of the calcined pellets (the mixed solution containing 5 wt % of sodium oxide and 3 wt % of silicon dioxide), and was subjected to an in-situ crystallization at 95° C. for 4 hours. The solid after crystallization was washed with water until the pH of the washing solution was less than 10, and dried at 80° C. for 10 hours to prepare an adsorbent A, the adsorbent A containing 89.3 wt % of Y molecular sieve a, 9.3 wt % of Y molecular sieve produced by a crystal transformation, and 1.4 wt % of matrix. See Table 2 for the adsorption selectivity measured by the pulse experiments, the adsorption capacity, the crushing rates under different pressures, and the calcined bulk density.

Example 7

The adsorbent was prepared according to the method in Example 6 except that in step (1), the nano NaY molecular sieve b prepared in Example 2 was mixed with kaolin, white carbon black and *sesbania* powder, and then rolled into shape. After an in-situ crystallization, an adsorbent B containing 89.3 wt % of Y molecular sieve b, 9.6 wt % of Y molecular sieve produced by a crystal transformation and 1.1 wt % of matrix was prepared. See Table 2 for the adsorption selectivity, the adsorption capacity, the crushing rates under different pressures, and the calcined bulk density.

Example 8

The adsorbent was prepared according to the method in Example 6 except that in step (1), the nano NaY molecular sieve c prepared in Example 3 was mixed with kaolin, white carbon black and *sesbania* powder, and then rolled into shape. After an in-situ crystallization, an adsorbent C containing 89.3 wt % of Y molecular sieve c, 9.8 wt % of Y molecular sieve produced by a crystal transformation and 0.9 wt % of matrix was prepared. See Table 2 for the adsorption selectivity, the adsorption capacity, the crushing rates under different pressures, and the calcined bulk density.

Example 9

The adsorbent was prepared according to the method in Example 6 except that in step (1), the nano NaY molecular sieve d prepared in Example 4 was mixed with kaolin, white carbon black and *sesbania* powder, and then rolled into shape. After in-situ crystallization, an adsorbent D containing 89.3 wt;% of Y molecular sieve d, 9.5 wt % of Y molecular sieve produced by a crystal transformation and 1.2 wt % of matrix was prepared. See Table 2 for the adsorption selectivity, the adsorption capacity, the crushing rates under different pressures, and the calcined bulk density.

Example 10

The adsorbent was prepared according to the method in Example 6 except that in step (1), the nano NaY molecular sieve e prepared in Example 5 was mixed with kaolin, white carbon black and *sesbania* powder, and then rolled into shape. After an in-situ crystallization, an adsorbent E containing 89.3 wt % of Y molecular sieve e, 10.0 wt % of Y molecular sieve produced by a crystal transformation and 0.7 wt % of matrix was prepared. See Table 2 for the adsorption selectivity, the adsorption capacity, the crushing rates under different pressures, and the calcined bulk density.

Comparative Example 4

The adsorbent was prepared according to the method in Example 6 except that in step (1), the NaY molecular sieve f prepared in Comparative Example 1 was mixed with kaolin, white carbon black and *sesbania* powder, and then rolled into shape. After an in-situ crystallization, an adsorbent F containing 97.2 wt % of Y molecular sieve and 2.8 wt % of matrix was prepared. See Table 2 for the adsorption selectivity, the adsorption capacity, the crushing rates under different pressures, and the calcined bulk density.

Comparative Example 5

The adsorbent was prepared according to the method in Example 6 except that in step (1), the NaY molecular sieve g prepared in Comparative Example 2 was mixed with kaolin, white carbon black and *sesbania* powder, and then rolled into shape. After an in-situ crystallization, an adsorbent G containing 97.6 wt % of Y molecular sieve and 2.4 wt % of matrix was prepared. See Table 2 for the adsorption selectivity, the adsorption capacity, the crushing rates under different pressures, and the calcined bulk density.

Comparative Example 6

The adsorbent was prepared according to the method in Example 6 except that in step (1), the NaY molecular sieve h prepared in Comparative Example 3 was mixed with kaolin, white carbon black and *sesbania* powder, and then rolled into shape. After an in-situ crystallization, an adsorbent H containing 97.6 wt % of Y molecular sieve and 2.4 wt % of matrix was prepared. See Table for the adsorption selectivity, the adsorption capacity, the crushing rates under different pressures, and the calcined bulk density.

Example 11

An experiment of adsorption and separation of m-xylene was carried out on a small simulated moving bed device with continuous countercurrent by using adsorbent A.

Figure 12:
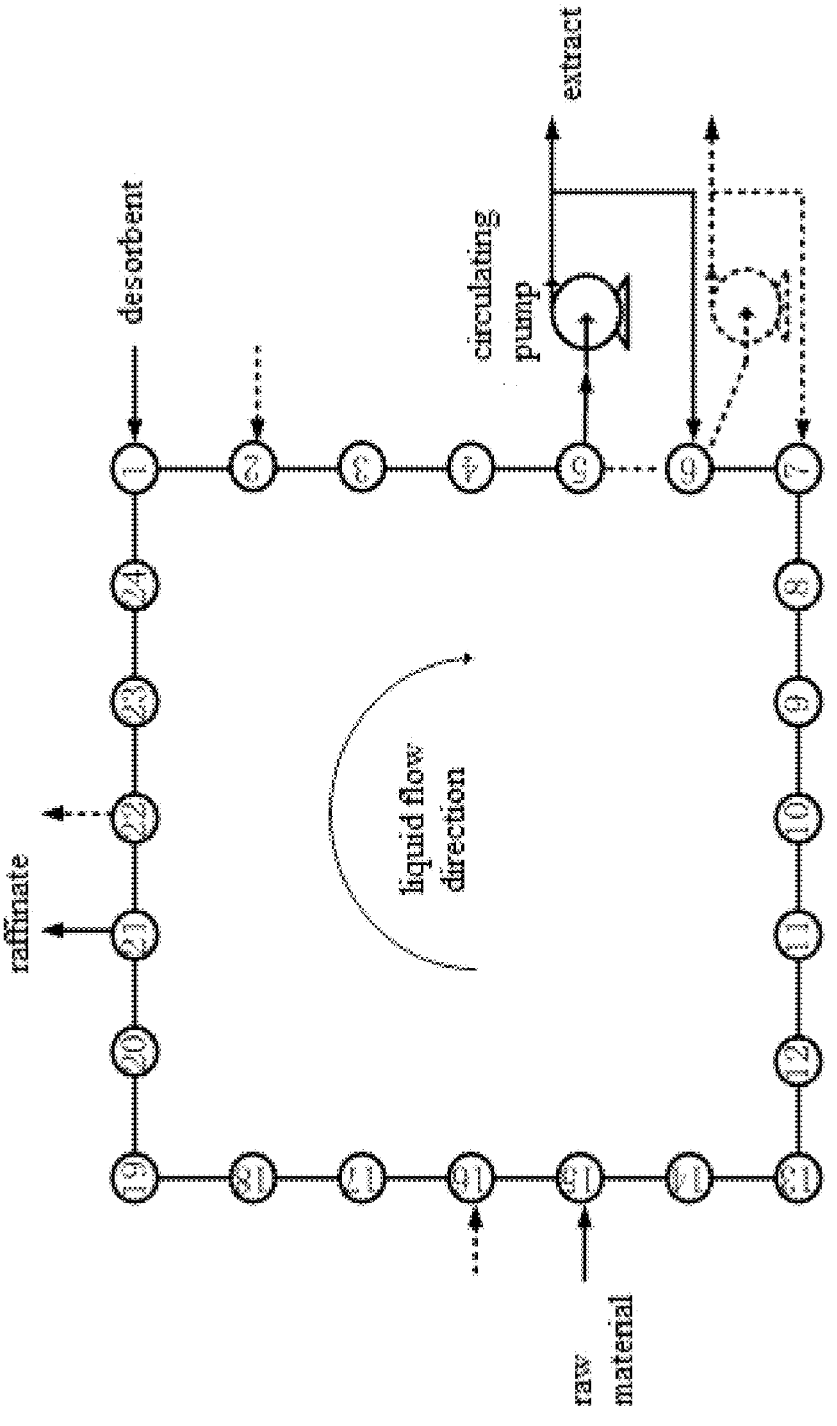
FIG. 12 is a schematic diagram of adsorption and separation in a small simulated moving bed.

The small simulated moving bed device comprises 24 adsorption columns in series, each column having a length of 195 millimeters, a column inner diameter of 30 millimeters, a total loading capacity of 3300 milliliters of adsorbent A. The head and tail two ends of the 24 columns in series were connected by a circulating pump to form a closed loop, as shown in FIG. 12. The 24 adsorption columns were divided into four sections by four streams of incoming and outgoing materials: adsorption raw material, desorbent, extrac and raffinate, namely 7 adsorption columns between the adsorption raw material (column 15) and the raffinate (column 21) as an adsorption zone, 9 adsorption columns between the extract (column 6) and the adsorption raw material (column 14) as a purification zone, 5 adsorption columns between the desorbent (column 1) and the extract (column 5) as a desorption zone, 3 adsorption columns between the raffinate (column 22) and the desorbent (column 24) as a buffer zone. The temperature for the adsorption and the separation was controlled at 145° C. and the pressure was 0.8 MPa.

During operation, the desorbent of toluene and the adsorption raw material were continuously fed into the above simulated moving bed device at a flow rate of 1600 ml/h and 500 ml/h respectively, the extract was withdrawn from the device at a flow rate of 761 ml/h, and the raffinate was extracted from the device at a flow rate of 1339 ml/h. The adsorption raw material consisted of 14.99 wt % of ethylbenzene, 20.14 wt % of p-xylene, 42.25 wt % of m-xylene, 21.75 wt % of o-xylene, and 0.87 wt % of non-aromatic-hydrocarbon components. Set a circulating pump flow rate at 3960 ml/h, and one adsorption column was moved forward in the same direction as the flow of the liquid every 70 seconds for the positions of the four steams of materials (in FIG. 12, from the solid line position to the dashed line position, and so on). The purity of m-xylene obtained under the stable operating condition was 99.58 wt %, and the yield was 97.15 wt %.

Example 12

A small simulated moving bed device was loaded with an adsorbent B, and an adsorption and separation experiment of m-xylene was carried out according to the method in Example 11. Under the stable operating condition, the purity of m-xylene obtained was 99.62 wt %, and the yield was 97.29 wt %.

Comparative Example 7

A small simulated moving bed device was loaded with a control adsorbent F, and an adsorption and separation experiment of m-xylene was carried out according to the method in Example 11. Under the stable operating condition, the purity of m-xylene obtained was 99.51 wt %, and the yield was 91.53 wt %.

Comparative Example 8

A small simulated moving bed device was loaded with a control adsorbent H, and an adsorption and separation experiment of m-xylene was carried out according to the method in Example 11. Under the stable operating condition, the purity of m-xylene obtained was 99.52 wt %, and the yield was 89.77 wt %.

TABLE 1

| Example No. | Y molecular sieve No. | specific surface area, $m^2/g$ | total pore volume, $cm^3/g$ | microporous pore volume, $cm^3/g$ | mesoporous pore volume, $cm^3/g$ | toluene adsorption capacity, mg/g |
|---|---|---|---|---|---|---|
| 1 | a | 871 | 0.52 | 0.33 | 0.19 | 254 |
| 2 | b | 860 | 0.51 | 0.33 | 0.18 | 250 |
| 3 | c | 846 | 0.50 | 0.33 | 0.17 | 247 |
| 4 | d | 820 | 0.48 | 0.32 | 0.16 | 245 |
| 5 | e | 792 | 0.46 | 0.32 | 0.14 | 242 |
| Comparative Example 1 | f | 705 | 0.33 | 0.32 | 0.01 | 236 |
| Comparative Example 2 | g | 701 | 0.32 | 0.31 | 0.01 | 235 |
| Comparative Example 3 | h | 745 | 0.81 | 0.30 | 0.51 | 233 |

TABLE 2

| item | | adsorbent No. | | | | | | | |
|---|---|---|---|---|---|---|---|---|---|
| | | A | B | C | D | E | F | G | H |
| toluene adsorption capacity, mg/g | | 248.8 | 245.9 | 243.7 | 241.2 | 239.8 | 229.4 | 229.4 | 227.4 |
| adsorption selectivity | $\beta_{MX/EB}$ | 4.87 | 4.93 | 4.83 | 4.75 | 4.53 | 4.32 | 4.10 | 4.08 |
| | $\beta_{MX/PX}$ | 2.27 | 2.31 | 2.23 | 2.21 | 2.10 | 2.02 | 1.86 | 2.01 |
| | $\beta_{MX/OX}$ | 2.25 | 2.28 | 2.22 | 2.20 | 2.07 | 2.00 | 1.86 | 1.92 |
| | $\beta_{MX/T}$ | 1.00 | 1.00 | 1.00 | 1.00 | 1.00 | 1.01 | 1.00 | 1.00 |
| $[S_A]_{10-90}$, ml | | 14.01 | 14.40 | 14.86 | 15.08 | 15.40 | 16.60 | 17.80 | 16.16 |
| $[S_D]_{90-10}$, ml | | 14.05 | 14.43 | 14.88 | 15.11 | 15.46 | 16.76 | 17.86 | 16.20 |
| crushing rate, wt % | 130N | 0.20 | 0.21 | 0.23 | 0.20 | 0.18 | 0.49 | 0.52 | 0.56 |
| | 250N | 2.59 | 3.02 | 3.16 | 2.72 | 2.35 | 5.83 | 6.17 | 6.75 |
| calcined bulk density, g/ml | | 0.64 | 0.64 | 0.64 | 0.65 | 0.65 | 0.65 | 0.65 | 0.61 |

The invention claimed is:

1. An m-xylene adsorbent, comprising 94 to 99.9 wt % of a Y molecular sieve and 0.1 to 6 wt % of a matrix, wherein;

the Y molecular sieve consists of a non-crystal-transformed Y molecular sieve and a Y molecular sieve produced by a crystal transformation, the non-crystal-transformed Y molecular sieve is a mesoporous nano Y molecular sieve, the mesoporous nano Y molecular sieve has a crystalline grain size of 20 to 450 nanometers, contains two types of mesoporous pores having most probable pore diameters of 5 to 20 nanometers and 25 to 50 nanometers, respectively, and has a specific surface area of 740-1000 $m^2/g$, a total pore volume of 0.40-0.65 $cm^3/g$ and a mesoporous pore volume of 0.08-0.35 $cm^3/g$.

2. The adsorbent according to claim 1, comprising 98 to 99.9 wt % of the Y molecular sieve and 0.1 to 2 wt % of the matrix.

3. The adsorbent according to claim 1, comprising 84 to 93 wt % the non-crystal-transformed Y molecular sieve, 1 to 15.9 wt % of the Y molecular sieve produced by the crystal transformation and 0.1 to 6 wt % of the matrix.

4. The adsorbent according to claim 1, wherein the adsorbent comprises 84 to 93 wt % of the non-crystal-transformed Y molecular sieve, 5 to 15.9 wt % of the Y molecular sieve produced by the crystal transformation and 0.1 to 2 wt % of the matrix.

5. The adsorbent according to claim 1, wherein the mesoporous nano Y molecular sieve is a self-aggregate of the nano-scale Y molecular sieve crystalline grains, the self-aggregate having a particle size of 0.5 to 1.5 microns, and the nano-scale Y molecular sieve crystalline grains in the self-aggregate having a particle size of 20 to 400 nanometers.

6. The adsorbent according to claim 1, wherein the mesoporous nano Y molecular sieve has a molar ratio of $SiO_2/Al_2O_3$ of 4.0 to 5.5.

7. The adsorbent according to claim 1, wherein the two types of mesoporous pores in the mesoporous nano Y molecular sieve have most probable pore diameters of 10-20 nm and 30-50 nm, respectively.

8. A method for preparing the adsorbent according to claim 1, comprising the following steps:

(1) mixing the non-crystal-transformed NaY molecular sieve, a kaolin mineral, a silicon source and a molding aid evenly, rolling into pellets, calcining at 530-600° C. after drying, wherein a weight ratio of the non-crystal-transformed NaY molecular sieve to the kaolin mineral is 85-94:6-15, and a weight ratio of silicon dioxide contained in the added silicon source to the kaolin mineral is 0.1-3.6; and (2) subjecting the pellets obtained after the calcining in step (1) to an in-situ crystallization with a sodium hydroxide solution or a mixed solution of sodium hydroxide and water glass at 85 to 100° C., such that the kaolin mineral therein is in-situ crystallized into a Y molecular sieve, then washed and dried.

9. The method according to claim 8, wherein the kaolin mineral in step (1) is selected from kaolinite, dickite, perlite, ovenstone, halloysite, and mixtures thereof.

10. The method according to claim 8, wherein the molding aid in step (1) is selected from at least one of lignin, *sesbania* powder, dry starch, carboxymethyl cellulose, and activated carbon.

11. The method according to claim 8, wherein the silicon source in step (1) is selected from one or more of ethyl orthosilicate, silica sol, water glass, sodium silicate, silica gel and white carbon black, the weight ratio of silicon dioxide contained in the added silicon source to the kaolin mineral is 0.2 to 3.0.

12. The method according to claim 8, wherein the liquid/solid ratio of the in-situ crystallization in step (2) is 1.5 to 5.0 L/kg.

13. The method according to claim 8, wherein a concentration of hydroxide ions in the sodium hydroxide solution-therein is 0.1 to 3.0 mol/L; and in the mixed solution of sodium hydroxide and water glass, the content of sodium oxide is 2 to 10 wt %, and a content of silicon dioxide is 1 to 6 wt %.

14. The method according to claim 8, wherein the preparation method of the non-crystal-transformed NaY molecular sieve in step (1) comprises the following steps:

(I) taking a silicon source and an aluminum source at 0-5° C., adding sodium hydroxide and water to form a molecular sieve synthesis system by mixing evenly, wherein the molar ratios of the respective components are $SiO_2/Al_2O_3$=5.5-9.5, $Na_2O/SiO_2$=0.1-0.3, $H_2O/SiO_2$=5-25, the temperature of the synthesis system is 1-8° C., and (II) statically ageing the molecular sieve synthesis system of step (I) at 20 to 40° C. for 10 to 48 hours, then statically crystallizing at 90 to 150° C. for 2 to 10 hours, stirring for 2 to 10 minutes, and statically crystallizing for continued 11 to 20 hours, washing and drying a resulting solid.

15. The method according to claim 14, wherein the molar ratios of the respective components in the molecular sieve synthesis system in step (I) are $SiO_2/Al_2O_3$=7 to 9, $Na_2O/SiO_2$=0.1 to 0.25, $H_2O/SiO_2$=8 to 20.

16. The method according to claim 14, wherein in step (II), the molecular sieve synthesis system is statically aged at 20 to 40° C. for 15 to 30 hours, then statically crystallized at 90 to 120° C. for 4 to 9 hours, stirred for 2 to 10 minutes, statically crystallized for continued 11 to 15 hours.

17. The method according to claim 14, wherein the aluminum source in step (I) is selected from one or more of a low alkalinity sodium metaaluminate solution, aluminum oxide, aluminum hydroxide, an aluminum sulfate solution, aluminum chloride aluminum nitrate, and sodium aluminate.

18. The method according to claim 14, wherein the content of $Al_2O_3$ in the low alkalinity sodium metaaluminate solution is 17 to 28 wt %, and the content of $Na_2O$ is 19 to 30 wt %.

19. The method of claim 14, wherein the silicon source is silica sol or water glass.

20. The method according to claim 19, wherein the $SiO_2$ content in the water glass is 25 to 38 wt %, and the $Na_2O$ content is 9 to 15 wt %.

* * * * *